G. D. KEMPTON.
Compensating-Journals.
No. 198,626.  Patented Dec. 25, 1877.
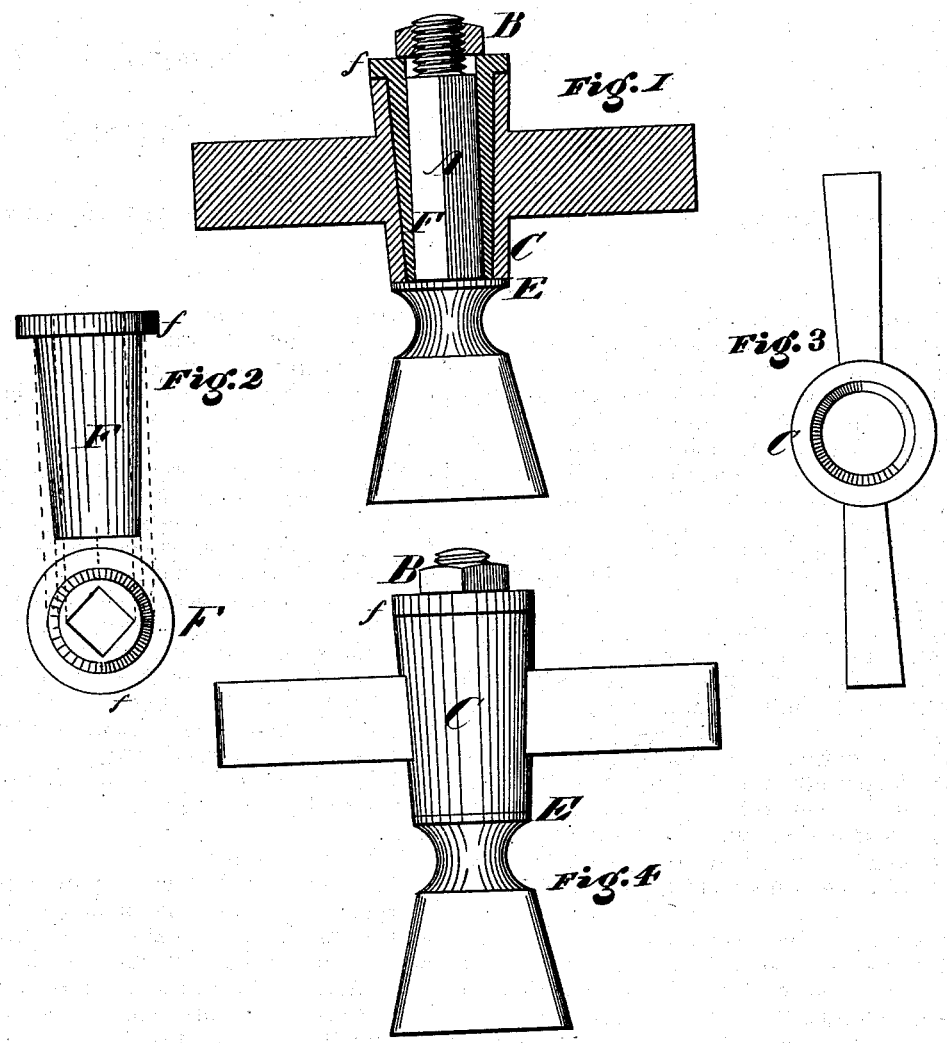

UNITED STATES PATENT OFFICE.

GEORGE D. KEMPTON, OF PHILADELPHIA, PENNSYLVANIA.

IMPROVEMENT IN COMPENSATING-JOURNALS.

Specification forming part of Letters Patent No. 198,626, dated December 25, 1877; application filed April 26, 1877.

*To all whom it may concern:*

Be it known that I, GEORGE D. KEMPTON, of Philadelphia, in the county of Philadelphia and State of Pennsylvania, have invented a certain new and useful Improved Swivel; and I do hereby declare the following to be a full, clear, and exact description of the invention, such as will enable others skilled in the art to which it pertains to make and use it, reference being had to the accompanying drawings, which form part of this specification, in which—

Figure 1 is a central longitudinal section of my invention. Fig. 2 is a side and end view of conical sleeve or bush. Fig. 3 is an end view of box or hub. Fig. 4 is a side view of swivel complete.

This invention has relation to swivels, adapted specially for use in connecting the shafts of vehicles to the axle; and it consists in the construction and combination of parts, as hereinafter described, the object being to provide for the adjustment of a conical sleeve to take up wear.

Referring to the accompanying drawings, A designates a square or angular bolt or shaft, having one end diminished and threaded to receive a nut, B. C is a box, in which said bolt or shaft turns. This box may be the hub of a pulley, or the center or part of any other device where so much friction takes place that the use of means for compensating for or taking up wear is requisite. In some cases the bolt or shaft will be stationary, while the wheel, pulley, or other object rotates.

E is a shoulder upon the bolt or shaft, which impinges upon one end of the hub or box through which the bolt or shaft passes.

The socket or bore of said box or hub is conical or tapering, its diameter diminishing toward the end against which comes the shoulder E.

F is a sleeve, of corresponding conical or tapering shape, and fitting said socket or bore snugly, as shown. The bolt or shaft A passes through said sleeve, which moves or remains stationary with the shaft.

One end of said sleeve is widened to form a shoulder, *f*, which impinges upon the end of the hub or box adjacent thereto.

In practice, the draft or end thrust comes on the shaft A, and is transferred to nut B. From this it passes to the conical bust or sleeve. The wear thus comes on flange or shoulder *f*, and lost motion is taken up by turning the nut B, and advancing the cone into the box or hub.

What I claim is—

The conical bush F, having an angular bore or central aperture and a shoulder, *f*, on its longer end, in combination with the conical box or hub C, angular shouldered and threaded shaft A, and nut B, the several parts being constructed and arranged substantially as and for the purpose specified.

In testimony that I claim the foregoing I have hereunto set my hand this 23d day of March, 1877.

GEORGE D. KEMPTON.

Witnesses:
I. A. CONNOLLY,
CHAS. F. VAN HORN.